United States Patent
Okitsu

(10) Patent No.: US 6,820,486 B2
(45) Date of Patent: Nov. 23, 2004

(54) PRESSURE GAUGE HAVING MECHANISM FOR OPENING AND CLOSING TRANSPARENT COVER PLATE

(75) Inventor: Masayuki Okitsu, Yawara-mura (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/621,969

(22) Filed: Jul. 17, 2003

(65) Prior Publication Data

US 2004/0020302 A1 Feb. 5, 2004

(30) Foreign Application Priority Data

Jul. 18, 2002 (JP) ........................................ 2002-209175

(51) Int. Cl.[7] .................................................. G01L 7/00
(52) U.S. Cl. ........................................ 73/700; 73/708
(58) Field of Search .......................... 73/700, 708, 727

(56) References Cited

U.S. PATENT DOCUMENTS 3,922,919 A * 12/1975 Schulze et al. ............... 73/743
5,349,866 A * 9/1994 Huang .......................... 73/727
5,355,733 A * 10/1994 Murphy et al. ................ 73/715
5,640,992 A * 6/1997 Huang ...................... 137/487.5
6,190,442 B1 * 2/2001 Redner .......................... 96/421

FOREIGN PATENT DOCUMENTS

JP 8062071 3/1996
JP 10206263 8/1998

* cited by examiner

Primary Examiner—Edward Lefkowitz
Assistant Examiner—Andre Allen
(74) Attorney, Agent, or Firm—Baker Botts LLP

(57) ABSTRACT

A pressure gauge having pressure range indicating needles allows the positions of the pressure range indicating needles to be moved without detaching the cover from the pressure gauge body. The pressure gauge has an internal device, a pointer, a pressure scale plate and pressure range indicating needles, which are provided in the pressure gauge body. A window hole is formed in the cover. A transparent cover plate is fitted in the window hole of the cover in such a manner as to be capable of being opened and closed. With the cover left attached to the pressure gauge body, the tip of a screwdriver or the like can be brought into contact with the pressure range indicating needles through the window hole when the transparent cover plate is open, to move the pressure range indicating needles.

4 Claims, 5 Drawing Sheets

(A-A)

(B-B)

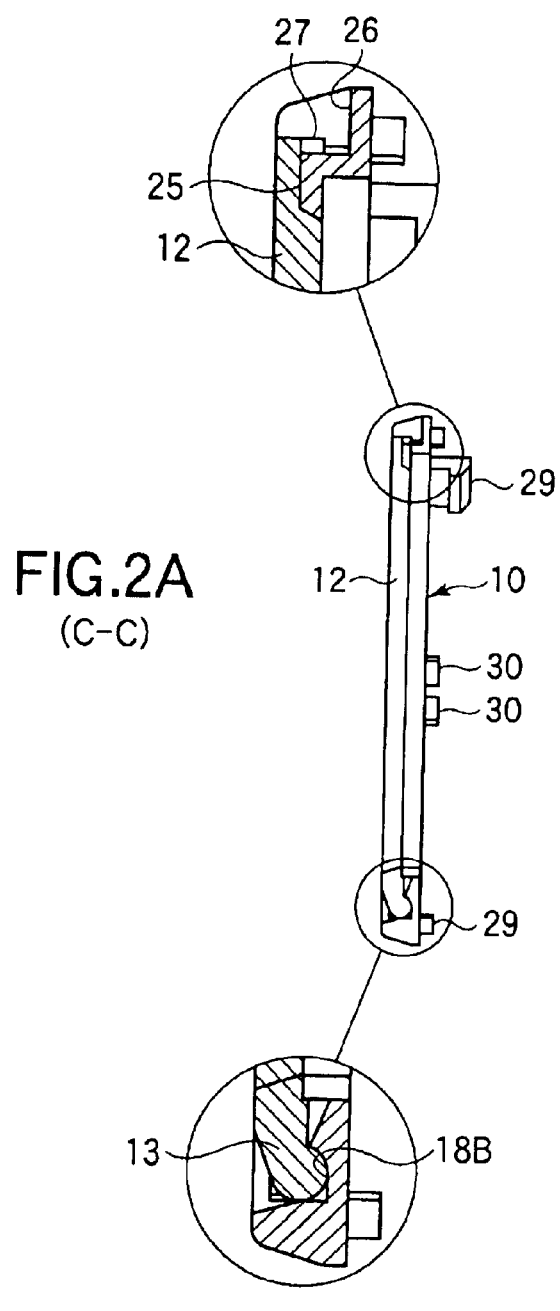
FIG.2A (C-C)
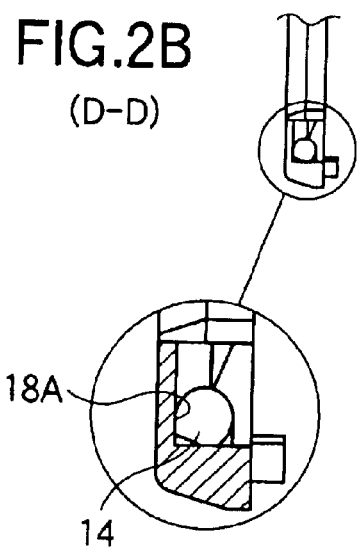
FIG.2B (D-D)

(A-A)

(B-B)

PRESSURE GAUGE HAVING MECHANISM FOR OPENING AND CLOSING TRANSPARENT COVER PLATE

BACKGROUND OF THE INVENTION

1. Field of the Invention

The present invention relates to a pressure gauge having pressure range indicating needles.

2. Discussion of Related Art

FIGS. 5A to 5C show a conventional pressure gauge having an internal device (not shown) in a pressure gauge body 1, together with a pressure scale plate 2, a pointer 3 and pressure range indicating needles 4. The internal device converts a fluid pressure into a corresponding movement of the pointer 3 to indicate the pressure by the position of the pointer 3. The pressure range indicating needles 4 are movable and capable of being held in desired positions, respectively. A cover 5 is detachably attached to the front of the pressure gauge body 1. FIG. 5B shows the pressure gauge from which the cover 5 has been detached. As shown in the figure, the pressure gauge body 1 has two retaining grooves 6. The cover 5 has two hooks (not shown) on the reverse side thereof. The hooks are engaged with the retaining grooves 6 to attach the cover 5 to the pressure gauge body 1. The pressure range to be maintained depends on the object for which the pressure measurement is carried out, and also depends on the way in which the pressure gauge is used. Therefore, when the pressure range is to be changed, the cover 5 is detached from the pressure gauge body 1, and the pressure range indicating needles 4 are moved along the pressure scale plate 2. When the cover 5 is to be detached, as shown in FIG. 5A, the cover 5 is rotated counterclockwise through about 15 degrees to cancel the engagement between the hooks of the cover 5 and the retaining grooves 6 of the pressure gauge body 1, and the hooks are removed from the large-width portions of the retaining grooves 6. When the cover 5 is to be attached, it is laid over the pressure gauge body 1 in the position shown in FIG. 5A, and the hooks are inserted into the large-width portions of the retaining grooves 6. Then, the cover 5 is rotated clockwise through about 15 degrees to engage the hooks with the small-width portions of the retaining grooves 6.

Thus, the conventional pressure gauge requires the following operations to move the positions of the pressure range indicating needles 4. First, the cover 5 is removed by rotating it through about 15 degrees. Then, the pressure range indicating needles 4 are moved to respective set positions by using the tip of a screwdriver or the like. Thereafter, the cover 5 is laid over the pressure gauge body 1 in the position shown in FIG. 5A, and the hooks are inserted into the large-width portions of the retaining grooves 6. Then, the cover 5 is rotated clockwise through about 15 degrees. Thus, the conventional pressure gauge requires a great deal of labor to detach and reattach the cover 5 (for instance, it is not easy to insert the hooks of the cover 5 into the large-width portions of the retaining grooves 6 of the pressure gauge body 1). The cover 5 may be lost or damaged during the operation of detaching and reattaching the cover 5. When a plurality of pressure gauges are disposed adjacent to each other as shown in FIG. 5C, the cover 5 cannot be rotated because it contacts the cover 5 of the adjacent pressure gauge. Therefore, the cover 5 cannot be detached from the pressure gauge body 1.

SUMMARY OF THE INVENTION

A first object of the present invention is to provide a pressure gauge having pressure range indicating needles wherein the positions of the pressure range indicating needles can be moved without detaching the cover from the pressure gauge body.

A second object of the present invention is to provide a pressure gauge having pressure range indicating needles wherein the positions of the pressure range indicating needles can be moved even when a plurality of pressure gauges are disposed adjacent to each other.

To attain the above-described objects, the present invention is applied to a pressure gauge having an internal device, a pointer, a pressure scale plate and pressure range indicating needles, which are provided in a pressure gauge body. The internal device converts a fluid pressure into a corresponding movement of the pointer to indicate the pressure by the position of the pointer. The pressure range indicating needles are movable and capable of being held in desired positions. In addition, a cover is detachably attached to the front of the pressure gauge body.

According to a first arrangement of the present invention, a window hole is formed in the cover, and a transparent cover plate is fitted in the window hole of the cover in such a manner as to be capable of being opened and closed, so that when the transparent cover plate is open, the pressure range indicating needles are movable.

According to a second arrangement of the present invention, the cover and the transparent cover plate in the first arrangement are arranged as follows. A portion of the transparent cover plate near one end thereof is engaged with a portion of the cover near one end of the window hole, whereby the transparent cover plate is rotatably fitted. In addition, a portion of the transparent cover plate near the other end thereof is retainable by a portion of the cover near the other end of the window hole.

According to a third arrangement of the present invention, the cover and the transparent cover plate in the second arrangement are arranged as follows. An engagement recess is formed on the cover near one end of the window hole, and an engagement projection is formed on the transparent cover plate near one end thereof. In addition, a retaining recess is formed on the cover near the other end of the window hole, and a retaining projection is formed on the transparent cover plate near the other end thereof.

According to a fourth arrangement of the present invention, the cover and the transparent cover plate in the second arrangement are arranged as follows. An engagement projection is formed on the cover near one end of the window hole, and an engagement recess is formed on the transparent cover plate near one end thereof. In addition, a retaining projection is formed on the cover near the other end of the window hole, and a retaining recess is formed on the transparent cover plate near the other end thereof.

Thus, according to the present invention, a window hole is formed in the cover, and a transparent cover plate is fitted in the window hole of the cover in such a manner as to be capable of being opened and closed. Therefore, with the cover left attached to the pressure gauge body, the tip of a screwdriver or the like can be brought into contact with the pressure range indicating needles through the window hole when the transparent cover plate is open, to move the pressure range indicating needles.

Further, when the pressure range indicating needles are to be moved, the transparent cover plate is opened, with the cover left attached to the pressure gauge body. Therefore, the positions of the pressure range indicating needles can be moved even when a plurality of pressure gauges are disposed adjacent to each other.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2A is a sectional view taken along the line C—C in FIG. 1A.

FIG. 2B is a sectional view taken along the line D—D in FIG. 1A.

DESCRIPTION OF THE PREFERRED EMBODIMENTS

FIGS. 1A to 4B show an embodiment of a pressure gauge having a mechanism for opening and closing a transparent cover plate according to the present invention. In the present invention, the structure of the pressure gauge body is the same as that of the prior art shown in FIG. 5B. Therefore, a description of the pressure gauge body is omitted herein. The cover of the conventional pressure gauge has a circular transparent portion in the center thereof to allow viewing of the pressure scale plate and so forth, and an opaque portion is provided outside the transparent portion of the cover. In the present invention, a cover 10 has a window hole 11 formed in a portion corresponding to the transparent portion of the cover of the conventional pressure gauge. A transparent cover plate 12 is fitted in the window hole 11 in such a manner as to be capable of being opened and closed. Accordingly, the cover 10 in the present invention is equivalent to the remainder of the cover of the conventional pressure gauge after a portion corresponding to the window hole 11 has been removed therefrom. As shown in FIGS. 1B and 1C, the surface of the cover 10 and the surface of the transparent cover plate 12 are flush with each other.

Figure 4A:
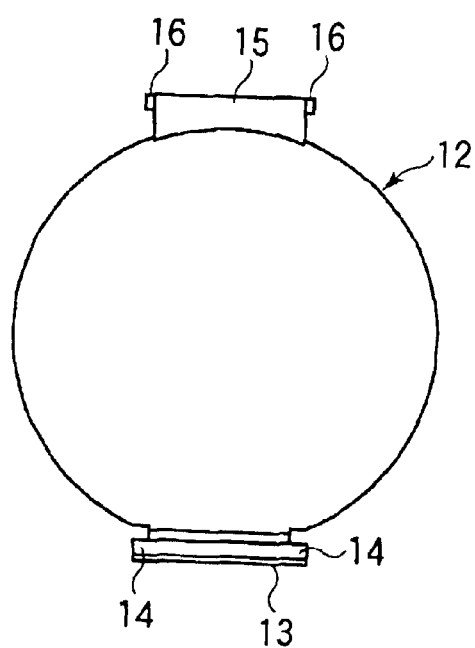
FIG. 4A is a front view of the transparent cover plate in the embodiment of the pressure gauge according to the present invention.
Figure 4B:
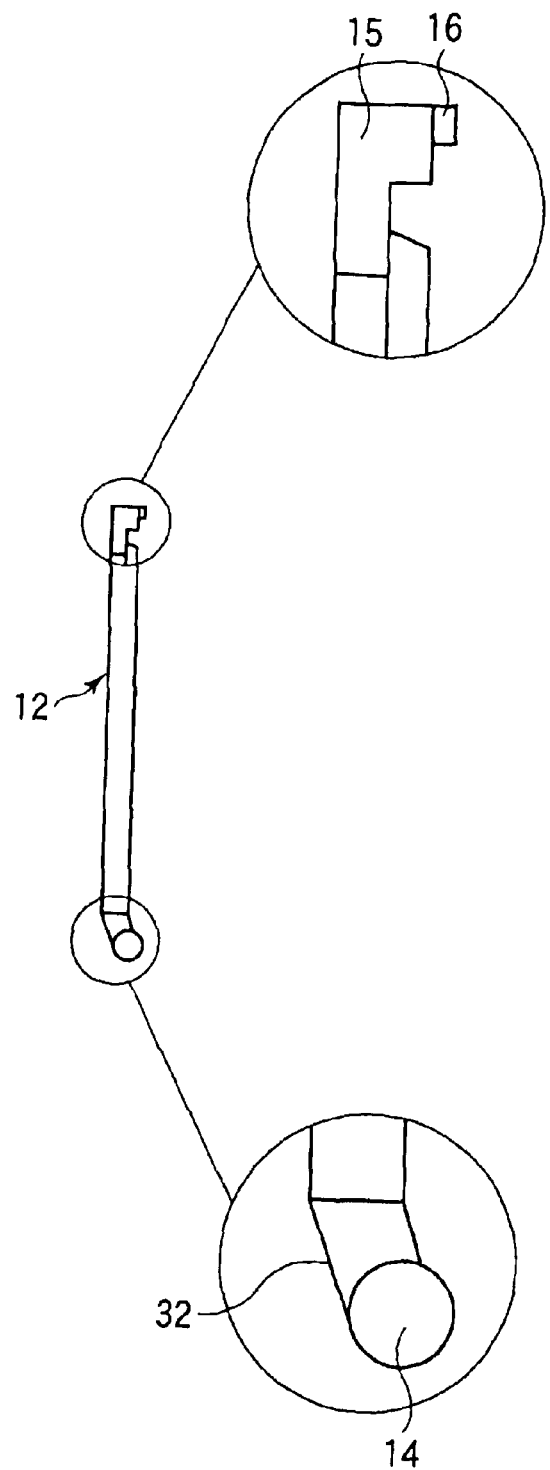
FIG. 4B is a right side view of the transparent cover plate shown in FIG. 4A.
Figure 5A:
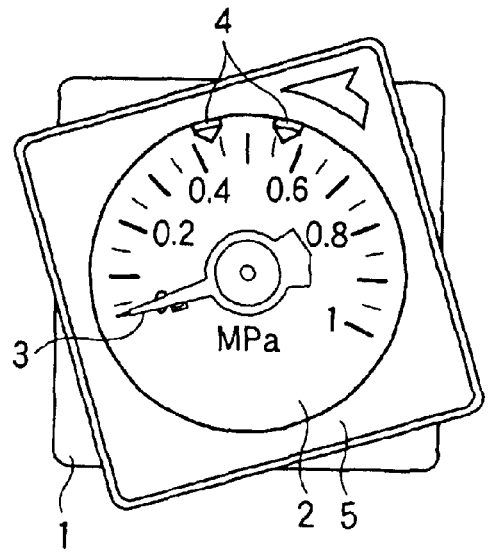
FIG. 5A is a front view showing the way in which a cover of a conventional pressure gauge is detached from the pressure gauge body.
Figure 5B:
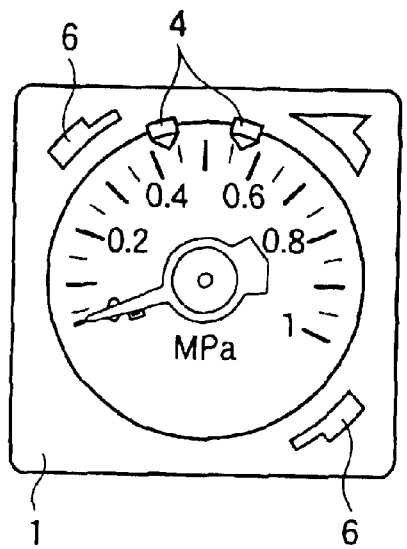
FIG. 5B is a front view of the conventional pressure gauge shown in FIG. 5A after the cover has been detached from the pressure gauge body.
Figure 5C:
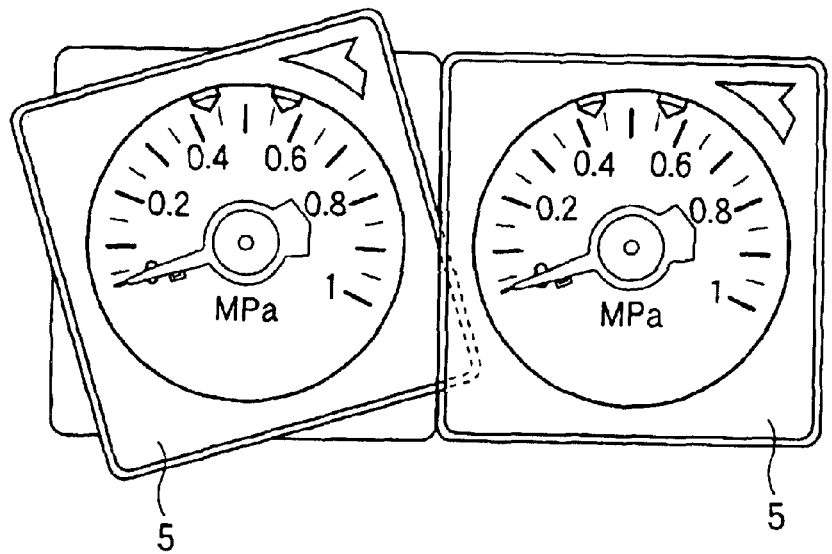
FIG. 5C is a front view showing an arrangement in which two conventional pressure gauges are disposed adjacent to each other.

As shown in FIGS. 4A and 4B, the transparent cover plate 12 has an approximately circular configuration as seen in a front view. The transparent cover plate 12 has a pivot shaft portion 13 formed at one end thereof (at the lower end thereof in FIG. 4A). The pivot shaft portion 13 is contiguous with the transparent cover plate 12 through a notched portion. Projecting portions at both ends of the pivot shaft portion 13 form engagement projections 14 having a circular sectional configuration. As shown in FIG. 4B, the notched portion of the transparent cover plate 12 is slanted (the surface of the notched portion will hereinafter be referred to as "slant portion 32"). The pivot shaft portion 13 is located rearward (rightward in FIG. 4B) of the plane portion of the transparent cover plate 12. A projecting portion 15 having an approximately rectangular configuration as seen in a front view is formed at the other end of the transparent cover plate 12 (at the upper end in FIG. 4A). Retaining projections 16 are formed at both ends of the projecting portion 15 (as seen in a front view). As shown in FIG. 4B, the surface of the projecting portion 15 is flush with the plane portion of the transparent cover plate 12. The retaining projections 16 project rearward from the rear side of the projecting portion 15.

The relationship between the transparent cover plate 12 and the cover 10 will be described below briefly. The cover 10 has a pair of engagement recesses 18 (comprising engagement recess portions 18A and 18B, as will be described later) formed near one end of the window hole 11 (near the lower end of the window hole 11 in FIG. 1A). The pair of engagement projections 14 of the transparent cover plate 12, which are formed near one end of the transparent cover plate 12, are rotatably engaged in the pair of engagement recesses 18 of the cover 10. The cover 10 further has a pair of retaining recesses 20 formed near the other end of the window hole 11 (near the upper end of the window hole 11 in FIG. 1A). The pair of retaining projections 16 of the transparent cover plate 12, which are formed near the other end of the transparent cover plate 12, are engageable with the retaining recesses 20 of the cover 10. As shown in FIGS. 1A to 2B, when the transparent cover plate 12 is fully closed, the retaining projections 16 of the transparent cover plate 12 are engaged in the retaining recesses 20 of the cover 10 to hold the transparent cover plate 12 in the fully closed position. When an engaging operation is performed to engage the retaining projections 16 into the retaining recesses 20 and also when a disengaging operation is performed to disengage the retaining projections 16 from the retaining recesses 20, the vicinities of the retaining projections 16 and the vicinities of the retaining recesses 20 are elastically deformed. Upon completion of the engaging operation and the disengaging operation, the vicinities of the retaining projections 16 and the vicinities of the retaining recesses 20 each return to the previous shape. In this embodiment, the transparent cover plate 12 is provided with the engagement projections 14 and the retaining projections 16 and the cover 10 is provided with the engagement recesses 18 and the retaining recesses 20, as stated above. However, the arrangement may be such that the transparent cover plate 12 is provided with engagement recesses and retaining recesses and the cover 10 is provided with engagement projections and retaining projections.

Next, the details of the relationship between the transparent cover plate 12 and the cover 10 will be described. As shown in FIGS. 1A to 3C, the pair of engagement recesses (left and right) 18 comprise a pair of engagement recess portions 18A engaging with the front surfaces (the upper surfaces in FIG. 1C) of the pair of engagement projections 14 of the transparent cover plate 12. The engagement recesses 18 further comprise an engagement recess portion 18B engaging with two portions of the pivot shaft portion 13 of the transparent cover plate 12 (for example, see the enlarged view at the lower end of FIG. 2A). Accordingly, strictly speaking, the pair of engagement projections 14 includes the two portions of the pivot shaft portion 13. The pair of engagement recess portions 18A are surfaces extending from the right and left ends of an upper cut portion 22 (see FIG. 1A) at one end of the cover 10 in the rightward and leftward directions (see FIG. 1C) by a predetermined distance along the reverse side of the cover 10. The engagement recess portion 18B is the surface of a support portion 23 formed at the rear of the upper cut portion 22. The lateral width of the support portion 23 is equal to that of the upper cut portion 22 (see FIG. 1C).

As will be understood from FIG. 2B, the upper sides of the pair of engagement recess portions 18A are open. Therefore, the pair of engagement projections 14 are inserted into the pair of engagement recess portions 18A from the upper side as viewed in FIG. 2B. After the insertion, the pair of engagement projections 14 are engaged with the pair of engagement recess portions 18A, and the pivot shaft portion 13 is engaged with the engagement recess portion 18B. It should be noted that when the pair of engagement projections 14 and the pivot shaft portion 13 are inserted, the pair of engagement projections 14, the pivot shaft portion 13 and the engagement recess portions 18A and 18B are elastically deformed. After the insertion, the elastically deformed portions each return to the previous shape. As will be understood from FIGS. 2A and 2B, the forward movement of the transparent cover plate 12 (leftward movement in FIG. 2B) is restrained by engagement of the pair of engagement projections 14 with the pair of engagement recess portions 18A. The backward movement of the transparent cover plate 12 (rightward movement in FIG. 2A) is restrained by engagement of the pivot shaft portion 13 with the engagement recess portion 18B.

Figure 1A:
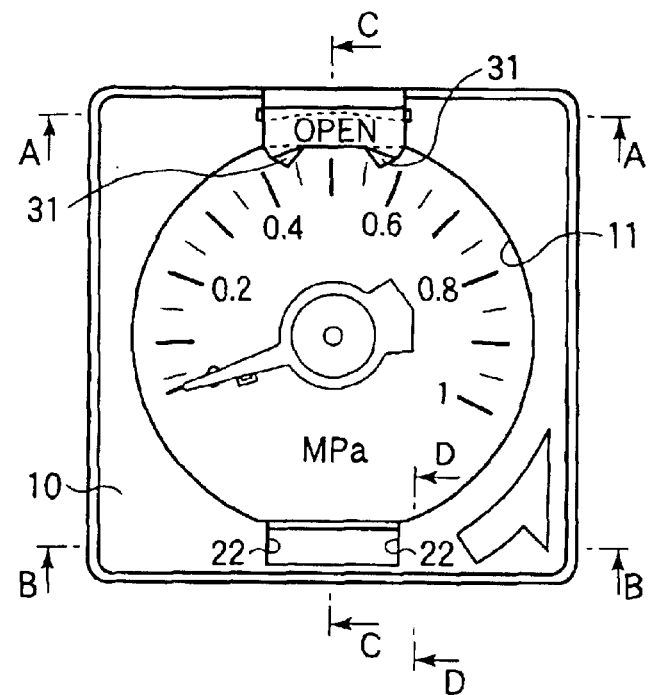
FIG. 1A is a front view of an embodiment of a pressure gauge having a mechanism for opening and closing a transparent cover plate according to the present invention in a state where the transparent cover plate is fully closed.
Figure 1B:
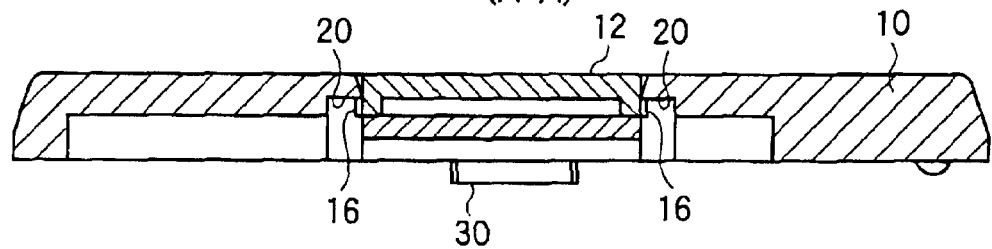
FIG. 1B is a sectional view taken along the line A—A in FIG. 1A.
Figure 1C:
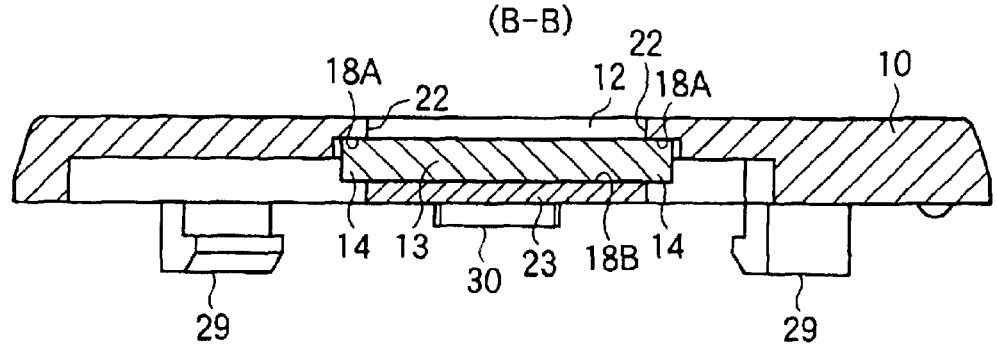
FIG. 1C is a sectional view taken along the line B—B in FIG. 1A.
Figure 3A:
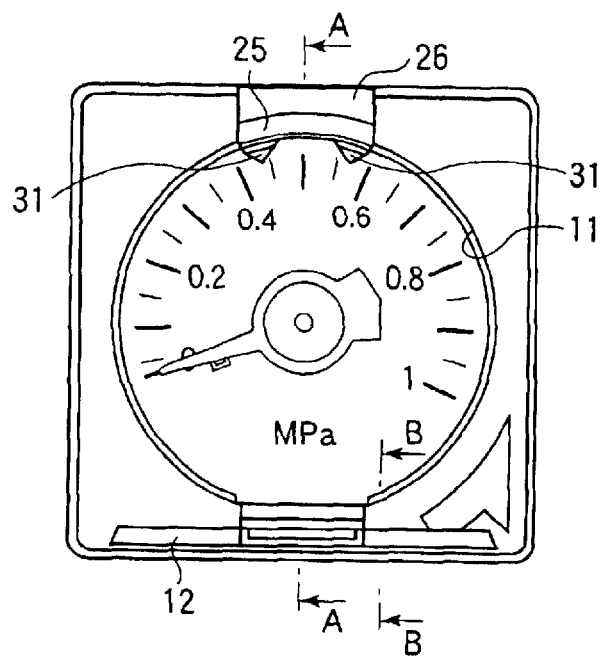
FIG. 3A is a front view of the embodiment of the pressure gauge according to the present invention in a state where the transparent cover plate is fully open.

As shown in FIGS. 2A and 3A, a shallow groove 25 is formed in the center of the other end of the cover 10 adjacently to the window hole 11, and a deep groove 26 is formed adjacently to the shallow groove 25. The lateral width of the shallow groove 25 is equal to that of the deep groove 26. The retaining recesses 20 are front wall surfaces (left wall surfaces in FIG. 2A) of holes 27 extending from the right and left ends of the deep groove 26 in the rightward and leftward directions by a predetermined distance. When the retaining projections 16 of the transparent cover plate 12 are engaged with the retaining recesses 20 of the cover 10, the reverse side of the projecting portion 15 of the transparent cover plate 12 is in contact with the shallow groove 25 of the cover 10. It should be noted that two hooks 29 and two slides 30 project from the reverse side of the cover 10. When the cover 10 is rotated relative to the pressure gauge body, the slides 30 move along engagement grooves (not shown) provided on the pressure gauge body.

Figure 3B:
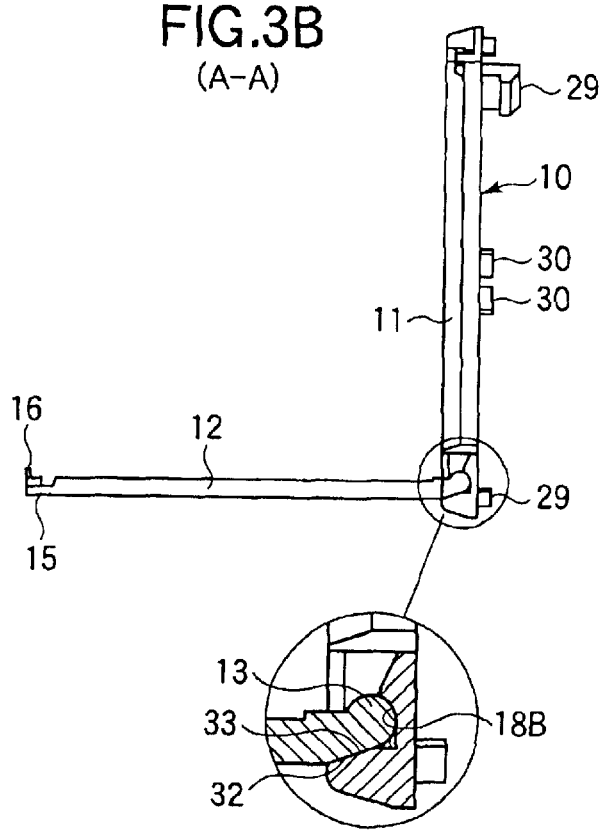
FIG. 3B is a sectional view taken along the line A—A in FIG. 3A.
Figure 3C:
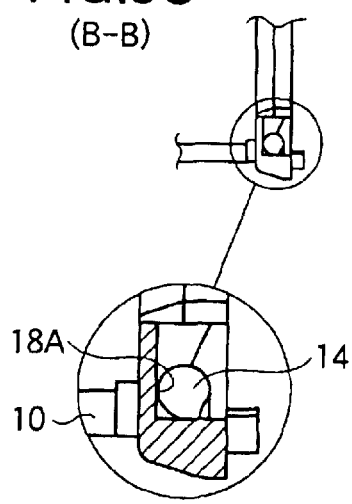
FIG. 3C is a sectional view taken along the line B—B in FIG. 3A.

The way of using the embodiment of the present invention (i.e. resetting of the pressure range indicating needles 31) will be described below. After the setting of the pressure range indicating needles 31, the transparent cover plate 12 is maintained in the fully closed position as shown in FIGS. 1A to 2B. When the pressure range indicating needles 31 are to be reset (moved), the tip of a fingernail or the like is engaged on the other end of the transparent cover plate 12 (i.e. the upper side of the portion marked "OPEN"), and the upper end of the transparent cover plate 12 is pulled forward (leftward in FIG. 3B). Consequently, the transparent cover plate 12 rotates through approximately 90 degrees about the pivot shaft portion 13 and the engagement projections 14, and the slant portion 32 of the transparent cover plate 12 abuts against the lower slant portion 33 of the engagement recess portion 18B of the cover 10. Thus, the transparent cover plate 12 stops in the fully open position as shown in FIGS. 3A to 3C.

With the cover 10 left attached to the pressure gauge body, the tip of a screwdriver or the like is brought into contact with the pressure range indicating needles 31 through the window hole 11 to move the pressure range indicating needles 31 to respective positions for resetting. After the pressure range indicating needles 31 have been reset, the transparent cover plate 12 is moved from the fully open position toward the fully closed position while elastically deforming the retaining projections 16, the retaining recesses 20 and so forth. Consequently, the reverse side of the projecting portion 15 of the transparent cover plate 12 abuts against the shallow groove 25 of the cover 10, and the retaining projections 16 of the transparent cover plate 12 engage in the retaining recesses 20 of the cover 10. Thus, the transparent cover plate 12 stops in the fully closed position as shown in FIGS. 1A to 2B.

It should be noted that the present invention is not necessarily limited to the foregoing embodiments but can be modified in a variety of ways without departing from the gist of the present invention.

What is claimed is:

1. A pressure gauge having an internal device, a pointer, a pressure scale plate and pressure range indicating needles, which are provided in a pressure gauge body, said internal device being adapted to convert a fluid pressure into a corresponding movement of said pointer to indicate the pressure by a position of said pointer, wherein said pressure range indicating needles are movable and capable of being held in desired positions, respectively, and a cover is detachably attached to a front of said pressure gauge body, said pressure gauge comprising:

a window hole formed in said cover; and a transparent cover plate fitted in the window hole of said cover in such a manner as to be capable of being opened and closed, so that when said transparent cover plate is open, said pressure range indicating needles are movable.

2. A pressure gauge according to claim 1, wherein a portion of said transparent cover plate near one end thereof is engaged with a portion of said cover near one end of said window hole, whereby said transparent cover plate is rotatably fitted, and a portion of said transparent cover plate near the other end thereof is retainable by a portion of said cover near the other end of said window hole.

3. A pressure gauge according to claim 2, wherein an engagement recess is formed on said cover near one end of said window hole, and an engagement projection is formed on said transparent cover plate near one end thereof, and wherein a retaining recess is formed on said cover near the other end of said window hole, and a retaining projection is formed on said transparent cover plate near the other end thereof.

4. A pressure gauge according to claim 2, wherein an engagement projection is formed on said cover near one end of said window hole, and an engagement recess is formed on said transparent cover plate near one end thereof, and wherein a retaining projection is formed on said cover near the other end of said window hole, and a retaining recess is formed on said transparent cover plate near the other end thereof.

* * * * *